United States Patent
Ando

[11] Patent Number: 5,311,495
[45] Date of Patent: May 10, 1994

[54] OPTICAL SYSTEM FOR CONVERGING LIGHT BEAMS TO FORM A SINGLE BEAM SPOT ON AN OPTICAL DISC

[75] Inventor: Hideo Ando, Tokyo, Japan

[73] Assignee: Kabushiki Kaisha Toshiba, Kawasaki, Japan

[21] Appl. No.: 799,188

[22] Filed: Nov. 27, 1991

[30] Foreign Application Priority Data

Nov. 30, 1990 [JP] Japan .................. 2-340265

[51] Int. Cl.⁵ .............................................. G11B 7/00
[52] U.S. Cl. ............................ 369/112; 369/44.23; 369/110; 369/121
[58] Field of Search ............... 369/112, 118, 110, 109, 369/44.11, 44.14, 44.23, 44.24, 13, 121; 360/114; 250/201.5; 359/831, 833, 834, 837, 858, 859

[56] References Cited

U.S. PATENT DOCUMENTS

| | | | |
|---|---|---|---|
| 4,460,990 | 7/1984 | Opheij | 369/118 |
| 4,464,567 | 8/1984 | Reilly et al. | 369/44.24 |
| 4,689,481 | 8/1987 | Ono | 369/44.14 X |
| 4,726,685 | 2/1988 | Kobayashi et al. | 369/110 X |
| 4,811,328 | 3/1989 | Ito et al. | 369/112 |
| 4,822,151 | 6/1989 | Tatsuno et al. | 369/121 X |
| 4,841,510 | 6/1989 | Yoshizawa | 369/44.14 X |
| 4,904,068 | 2/1990 | Tatsuno et al. | 369/112 X |
| 5,072,437 | 12/1991 | Chikuma | 369/118 |
| 5,121,378 | 6/1992 | Hirose et al. | 369/118 |

FOREIGN PATENT DOCUMENTS

| | | |
|---|---|---|
| 0184750 | 6/1986 | European Pat. Off. . |
| 0346844A3 | 12/1989 | European Pat. Off. . |
| 0099928 | 5/1987 | Japan .................. 369/44.23 |
| 1-315041 | 12/1989 | Japan . |
| 2-12623 | 1/1990 | Japan . |
| 2-161628 | 6/1990 | Japan . |
| 2182168A | 5/1987 | United Kingdom . |

Primary Examiner—W. R. Young
Assistant Examiner—Thang V. Tran
Attorney, Agent, or Firm—Finnegan, Henderson, Farabow, Garrett & Dunner

[57] ABSTRACT

In an optical system for converging light beams to form a single beam spot on an optical disc, a light beam generated from a semiconductor laser is collimated by a collimator lens and is guided to a prism member. In the prism member, the light beam is divided into two segment beams having same intensity distributions which are similar to that of the generated light beam by a polarization beam splitting face. One of the segment beams is reflected to an objective lens and the other of the segment beams is guided to a wave surface changing member. Which change the configuration or distribution of the other segment beam. The other segment beam having a deformed intensity distribution is also guided to the objective lens from the changing member and is combined with the one segment beam to form the single beam spot on the disc.

14 Claims, 9 Drawing Sheets

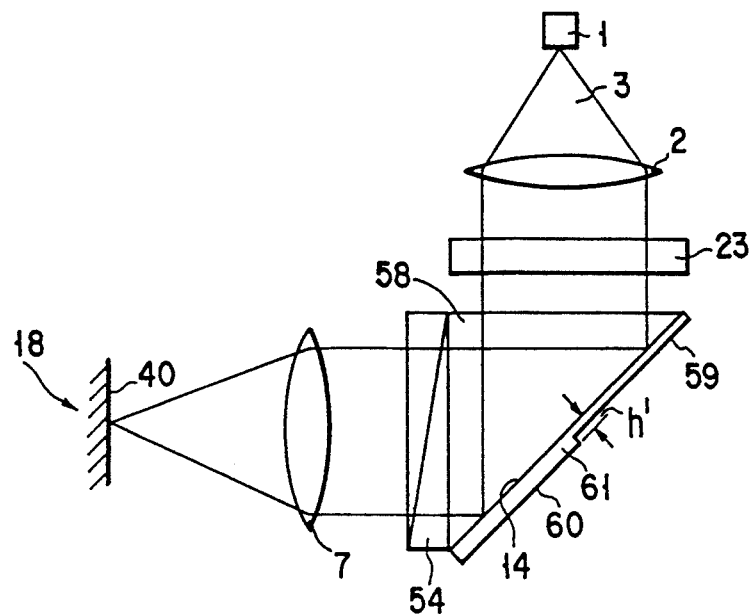
F I G. 7
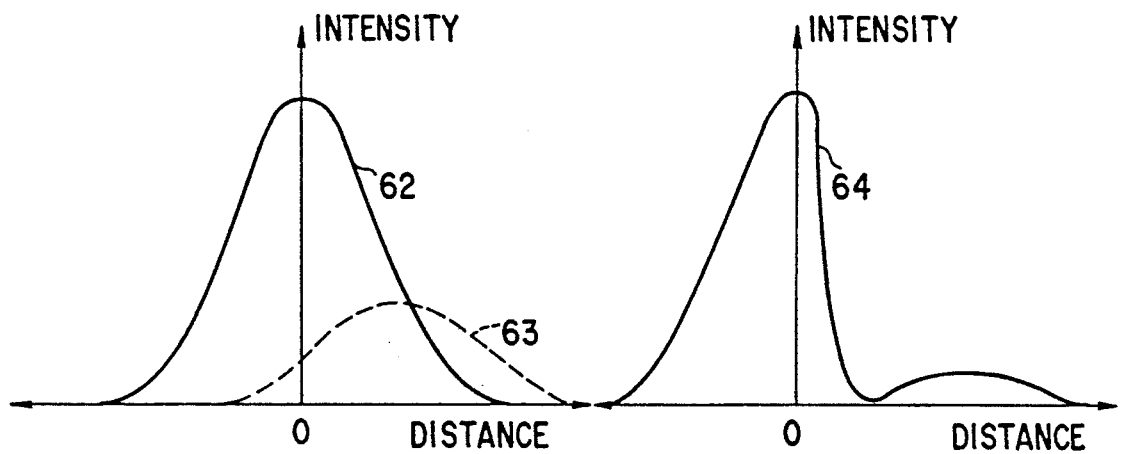
F I G. 8A  F I G. 8B

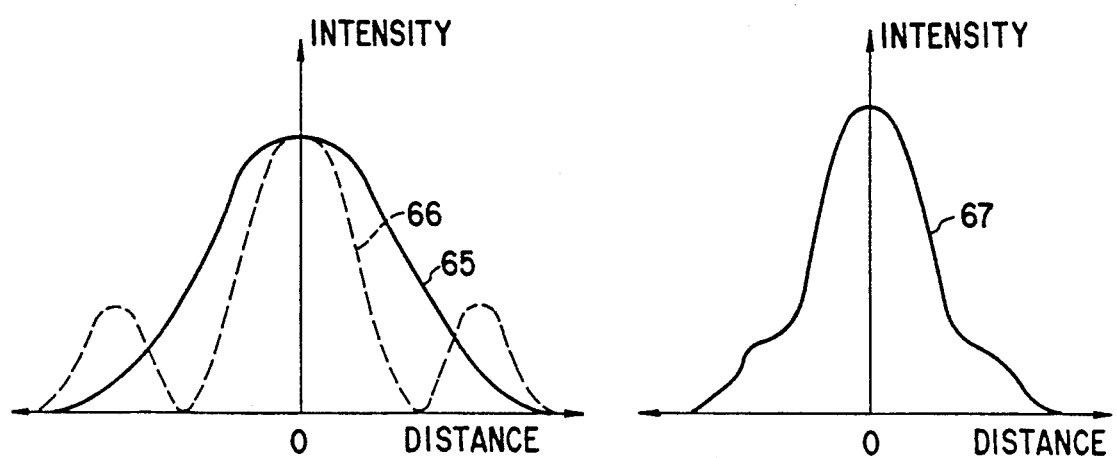
F I G. 9A    F I G. 9B
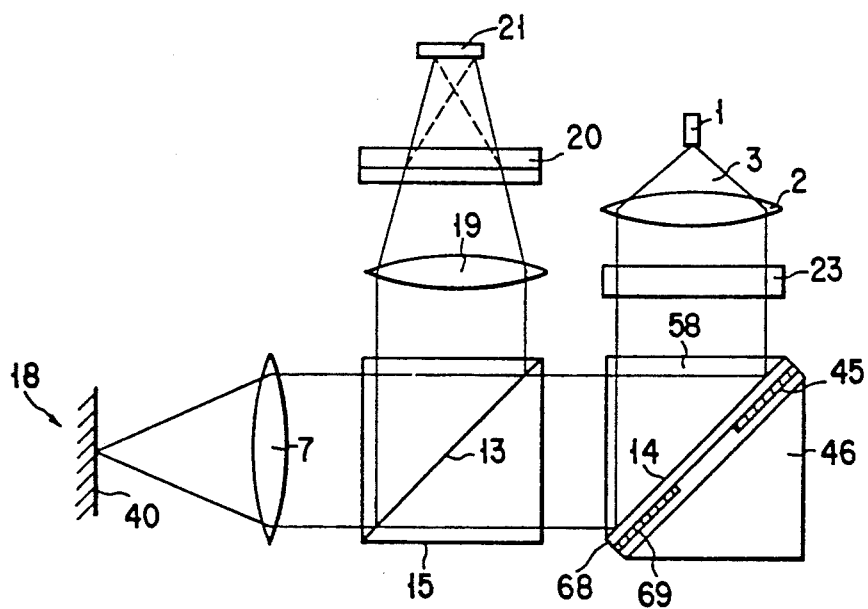
F I G. 10

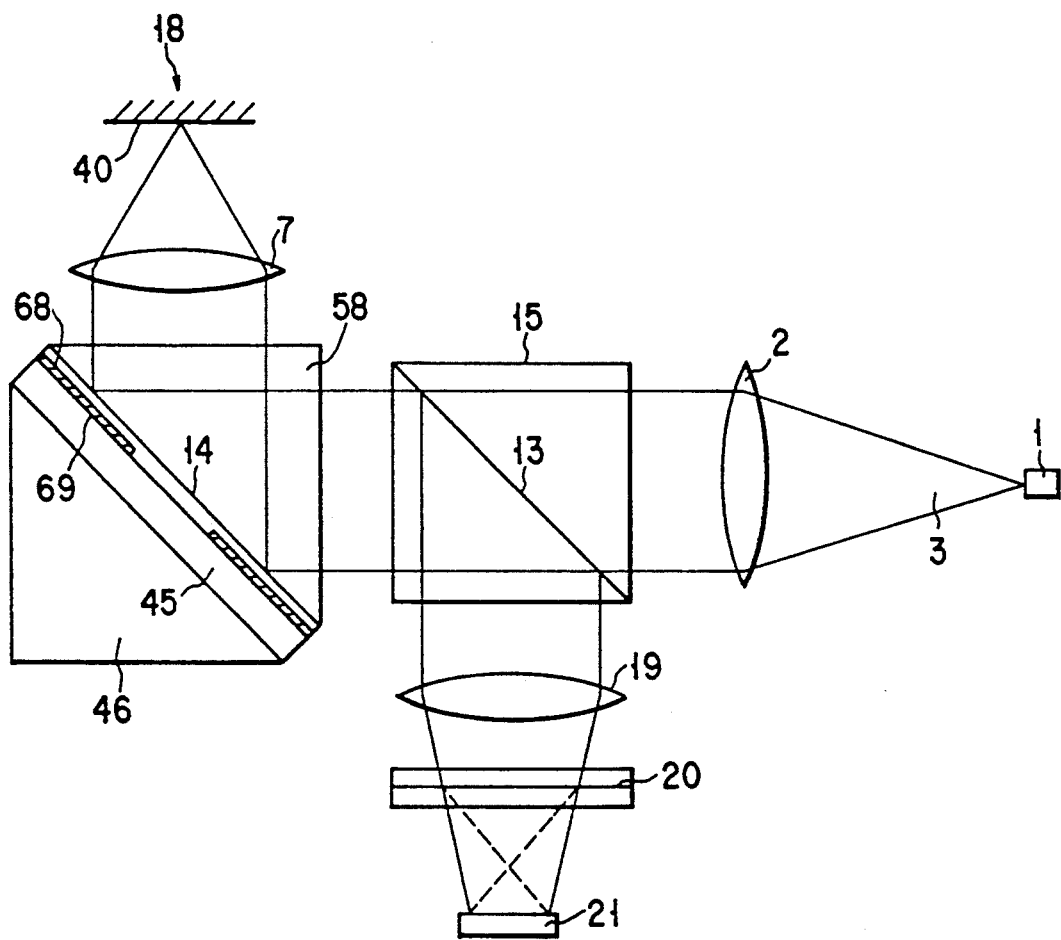
F I G. 11

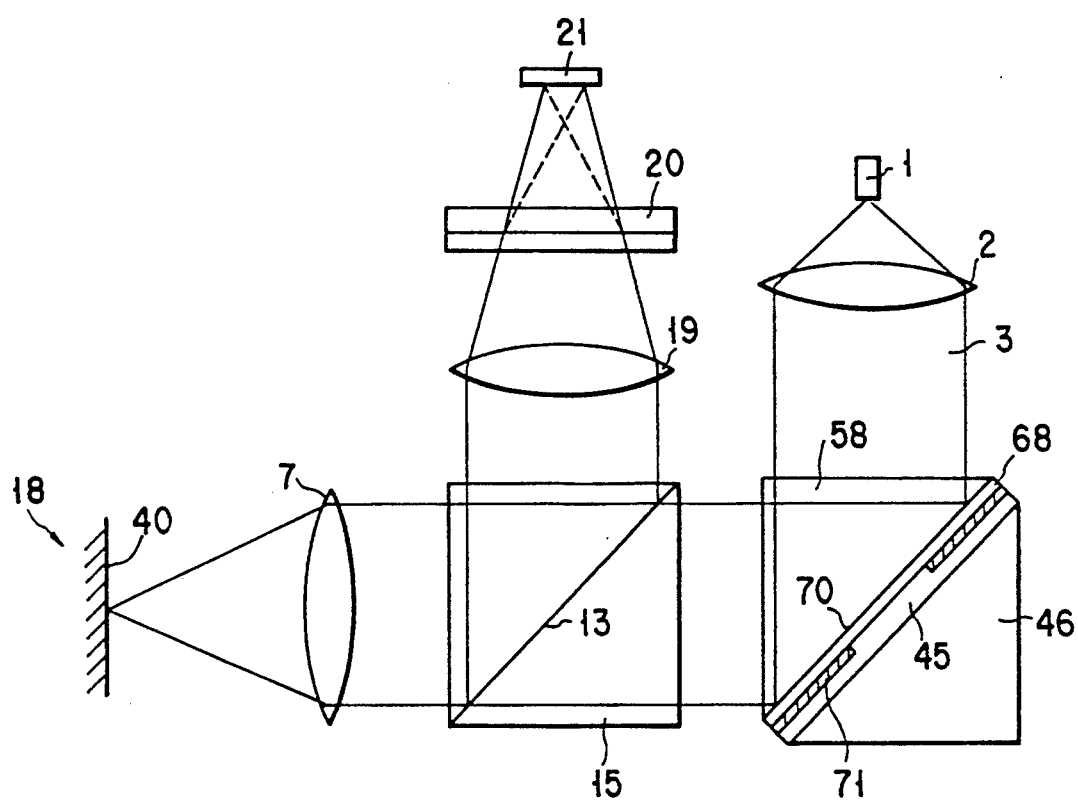
F I G. 12

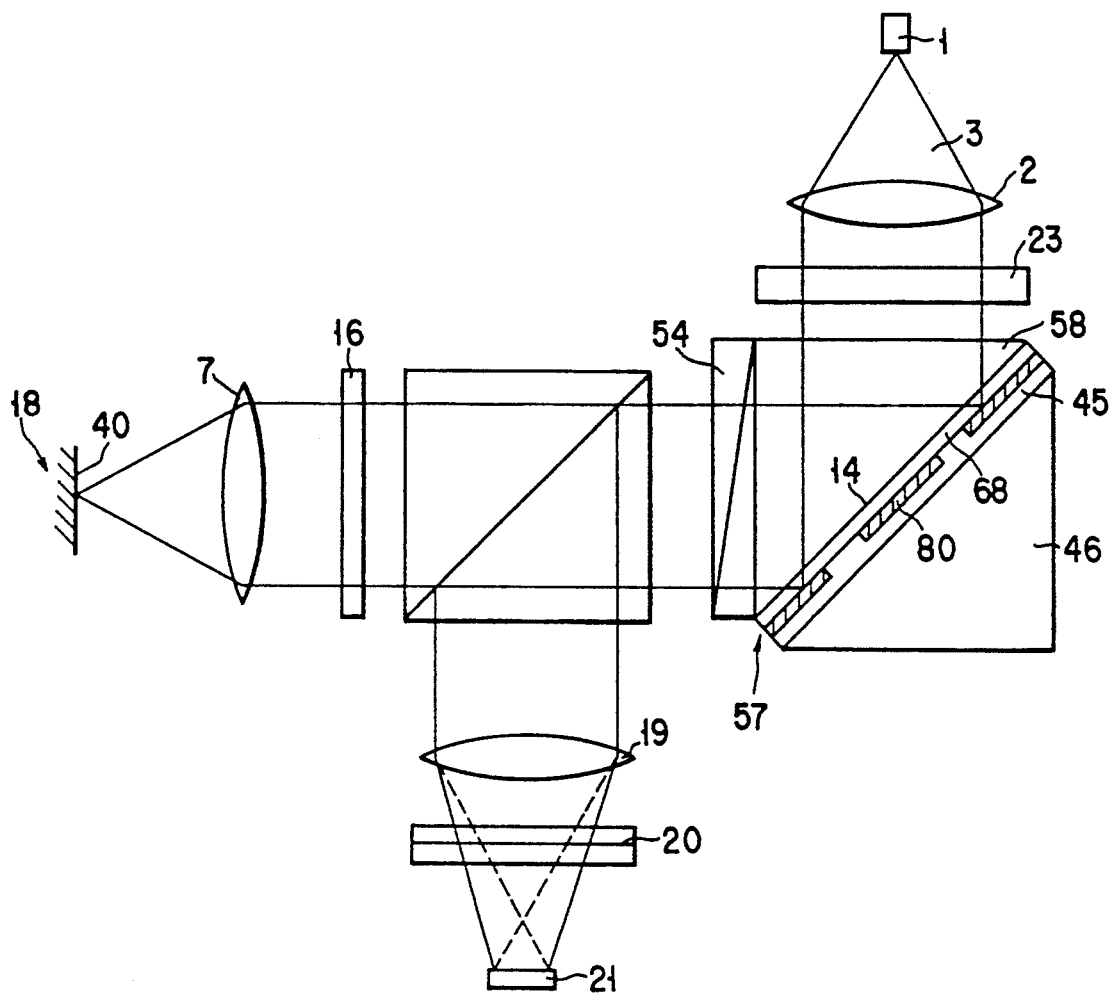
F I G. 13
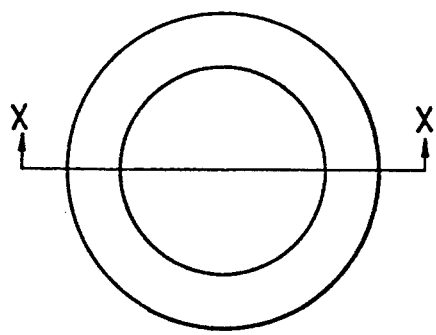
F I G. 14A

OPTICAL SYSTEM FOR CONVERGING LIGHT BEAMS TO FORM A SINGLE BEAM SPOT ON AN OPTICAL DISC

BACKGROUND OF THE INVENTION

1. Field of the Invention

This invention relates to an optical system for converging light beams to form a single beam spot on an optical disc, and more particularly to an improvement of the optical system of an optical disc apparatus.

2. Description of the Related Art

When information is read from or written in an information recording medium in a conventional optical disc apparatus, an objective lens is maintained in a focusing state and a laser beam from a light source is converged by an objective lens so as to form a focused beam spot on an optical disc.

In the conventional optical disc apparatus, a laser beam cannot be converged by the objective lens so as to fall within the diffraction limitation determined by the wavelength of the laser beam. It is considered that the degree of density of the recording and reproduction of information is limited.

SUMMARY OF THE INVENTION

The object of this invention is to provide an optical system for converging laser beams to form a sufficiently small beam spot on an optical disc.

In order to attain the object, this invention provides an optical system for converging light beams to form a single beam spot, comprising a light source, means for splitting the light beams emitted from the light source into split light beams, means for changing characteristics of at least one of the split light beams, means for combining the split light beams, and means for converging the light beams.

The light beams are split into two segments One segment of the split light beams is adapted to form an ordinary converging pattern on an optical disc. The other split light beams is changed in their characteristics such that they describe, on the optical disc, a converging pattern which has a relatively small central intensity and a wider distribution. The phase difference between the two split light beams is set to λ/2 so as to interfere with each other, thereby reducing the amount of light at the peripheral portion of the converging patterns and thus enabling the size of converging light spot to be substantially minimized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5 to 7 are schematic views of modifications of the optical disc apparatus as shown in FIG. 1;

FIGS. 8A and 8B are graphs showing the light amplitude distributions of the optical system as shown in FIG. 7;

FIGS. 9A and 9B are graphs showing the light amplitude distributions of another embodiment according to the optical disc apparatus of this invention;

FIG. 10 is a schematic view of an optical system attaining the light amplitude distribution shown in FIGS. 9A and 9B;

FIGS. 11, 12 and 13 are schematic views of further modifications of the optical system as shown in FIG. 10; and FIGS. 14A to 14E are, respectively, a light beam pattern, a light amplitude distribution and a mirror face pattern, all obtained from simulation for obtaining the optical system as shown in FIG. 13.

DETAILED DESCRIPTION OF THE PREFERRED EMBODIMENTS

Figure 1:
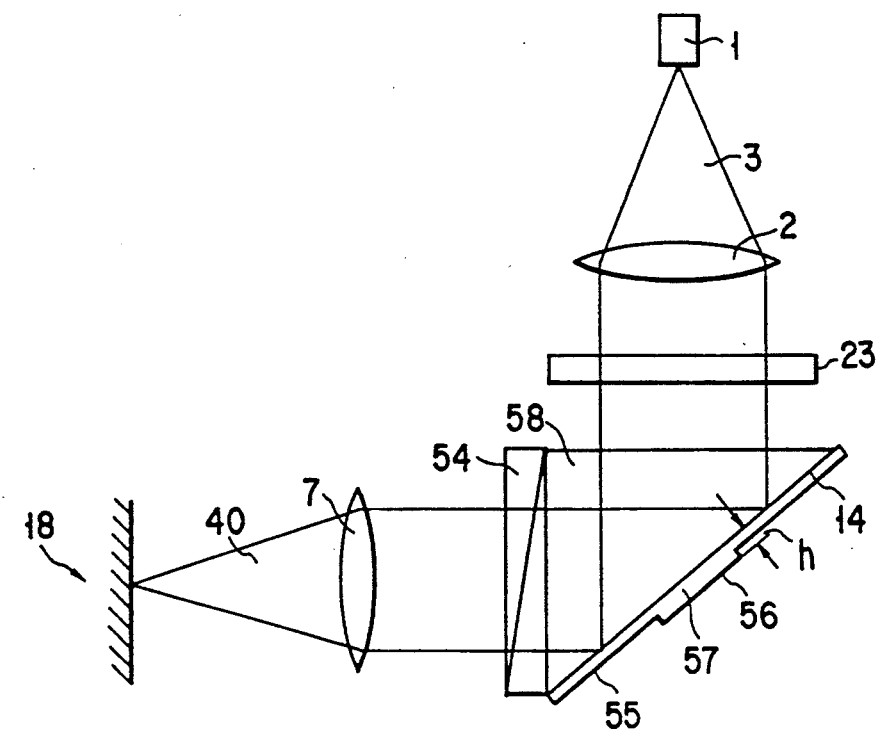
FIG. 1 is a schematic view of the optic system according to one embodiment of the optical disc apparatus of this invention.

FIG. 1 shows one embodiment of the optical disc apparatus according to this invention, and FIGS. 2A to 4B illustrate the fundamental principle of this invention. First, the fundamental principle of this invention will be explained with reference to FIGS. 2A to 4B, and then a concrete optical system will be described with reference to FIGS. 1 and 5.

Figure 2A:
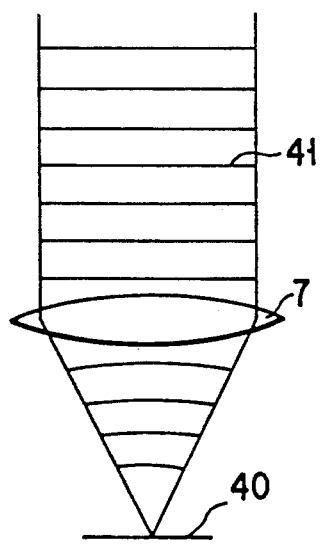
FIGS. 2A, 2B, 3A, 3B, 4A and 4B illustrate the fundamental principle of the optical disc apparatus as shown in FIG. 1.
Figure 3A:
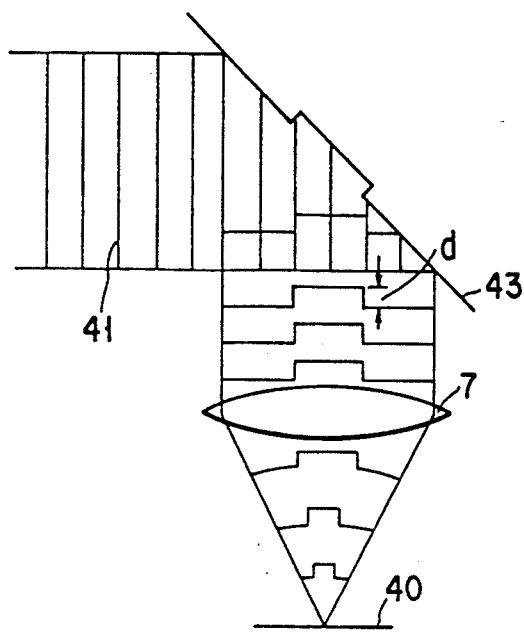
Figure 3B:
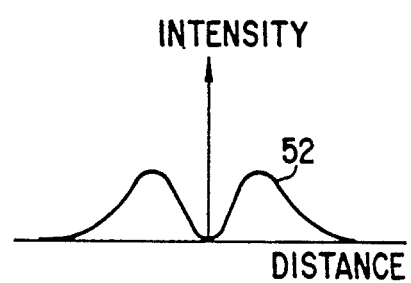

Laser beams 3 having a substantially cophasal surface 41 pass through an objective lens 7 and converge in a focusing state as shown in FIG. 2A, and then a beam spot having an amplitude distribution 51 with a peak at its center is formed on an information recording medium or a recording layer 40 on an optical disc. When the laser beams having the plano-cophasal surface 41 are reflected by a light reflecting face 43 having a height difference h as shown in FIG. 3A, a portion of the cophasal surface of the laser beams just after they have reflected is out of phase by a distance d which corresponds to λ/2 (where λ is the wavelength of the laser beams 3). The laser beams 3 converged by the objective lens 7 form, on the recording layer 40 of the information recording medium, a beam spot having an amplitude distribution 52 as shown in FIG. 3B.

The light reflecting face 43 having a height difference may have a cross sectional view of a striped shape, a concentric shape or an elliptical shape, when viewed from the light incidence side of the laser beams 3. In a focus state, the segment light beams having amplitude distributions 51 and 52 as shown in FIG. 2A or FIG. 2B form the common plane cophasal surface on the recording layer 40 of the information recording medium.

Figure 4A:
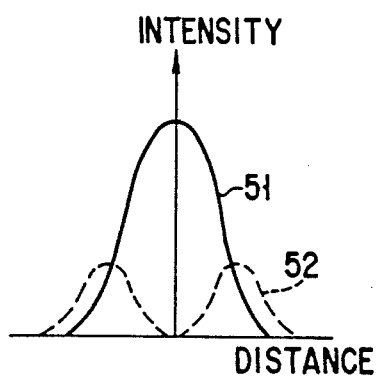
Figure 4B:
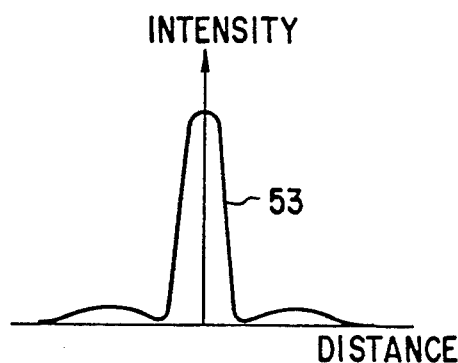

As shown in FIG. 4A, the amplitude distributions 51 and 52 of the two segment light beams overlap with each other such that both the amplitude distributions interfere with each other. In particular, when the phase difference is λ/2, the amplitude distributions of both the segment laser beams interfere with each other so as to be canceled out. As shown in FIG. 4B, the result is that the peripheral portions of the amplitude distribution 51 of the segment light beams are eliminated and a light converging spot is formed which has a narrower amplitude distribution 53 than the amplitude distribution 51 of one light beam.

Figure 2B:
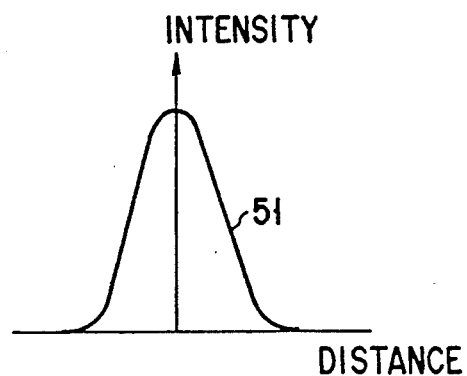

Normally, one laser beam 3 converged by the objective lens 7 forms a light converging spot extended as shown in FIG. 2B due to the diffraction of the light beam. Thus, it is considered impossible to limit the light beam within the diffraction limitation with the conventional art. With this invention, however, the use of interference of two segment light beams facilitates the formation of a small light converging spot, as shown in FIG. 4A.

An embodiment of the light converging optical system according to this invention, which enables a spot size to be minimized by the use of interference of two segment light beams will now be set forth with reference to FIGS. 1 and 5.

Figure 5:
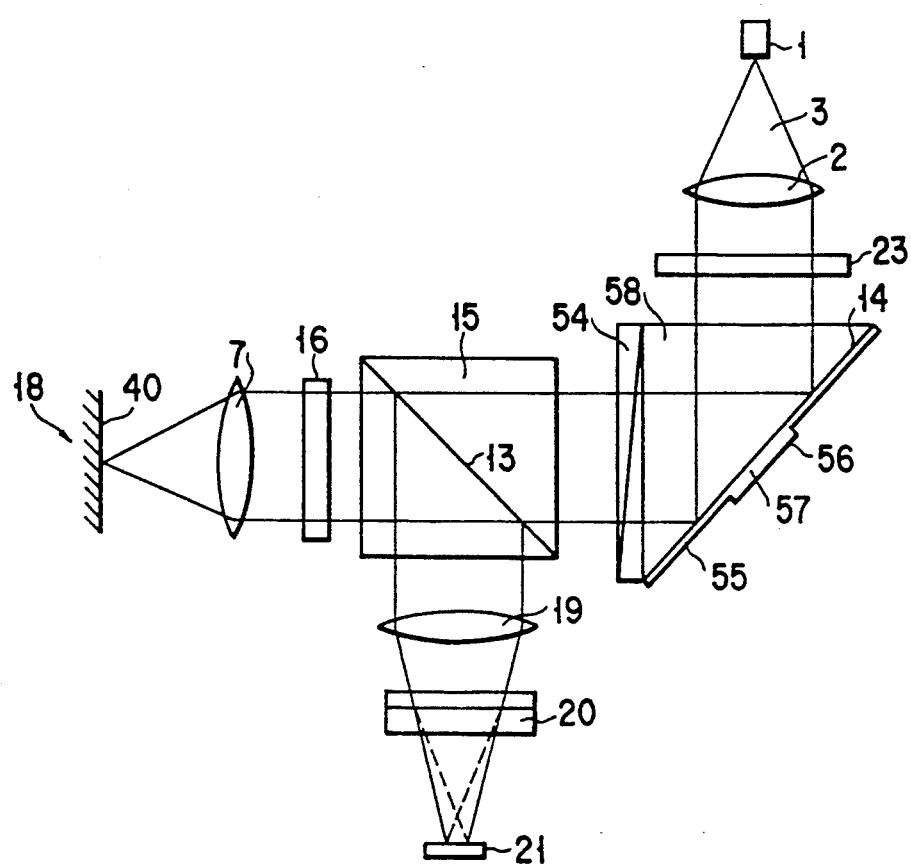

In the optical system as shown in FIGS. 1 and 5, laser beam 3 generated from a semiconductor laser 1 pass through a collimating lens 2 and is changed to a collimated light beam having a flat cophasal surface waves. After having passed through a $\lambda/2$ plate 23, the laser beam 3 is directed toward a triangular pillar-shaped prism member 58. The direction of the oscillation of the magnetic field of the laser beam 3 is turned properly by means of the $\lambda/2$ plate 23 in the predetermined direction. In the prism member 58, the s-wave surface of the laser beam is reflected by a polarization beam splitting face 14 to be directed toward an analyzer 54, and the p-wave surface of the laser beam passes through the polarization beam splitting face 14 to be directed toward a wave surface changing member 57 which changes the configuration of the wave surface of the laser beams. In this way, an amplitude of one laser beam is divided into two segment beams having same intensity distributions which are similar to that of the generated light beam, by the polarized splitting face. The wave surface changing member 57 has a first plane 55 and a second plane 56 having a specific height difference from the first plane 55. The p-wave surface of the laser beam 3 is totally reflected by the first and second planes 55 and 56 such that their wave surface is changed from a planar shape into a shape having a local stepped portion. As having been described already, the shape of the first plane 55 may be of a striped type, or may be elliptical or circular The analyzer 54 is provided on emerging surface of the triangle pillar-shaped prism member 58. The analyzer 54 is made from an anisotropic film of material such as gelatin, or comprises a beam splitter arranged in a twisted state from that face of the prism member 58 on which the polarization beam splitting layer 14 is formed. In this respect, the analyzer 54 allows only light beams having a specific polarizing direction to pass therethrough and is designed to permit both s-wave surface and p-wave surface to pass therethrough at a specific proportion, for example, equal transmittances. The s-wave surfaces and p-wave surfaces split from the light beam are combined again at the analyzer 54.

As known well, the laser beams combined at the analyzer 54 pass through the beam splitter 15 and a $\lambda/4$ plate 16 and are converged on an information recording medium or the recording face 40 of an optical disc 18 by means of the objective lens 7. In this state, a beam spot is formed. As explained with reference to FIGS. 3A, 3B, 4A and 4B, the size of the beam spot formed according to this invention is smaller than the one formed by the one laser beam whose surface wave is aligned in the conventional art as explained with reference to FIGS. 2A and 2B, whereby the recording density of information recorded on the optical disc 18 can be made higher.

In an optical information reproducing apparatus, the optical system as shown in FIG. 1 can be embodied by an optical system as shown in FIG. 5, for example. The beam splitter 15 is provided between the $\lambda/4$ plate 16 and the analyzer 54. Diverging laser beam reflected by the optical disc 18 are converged by the objective lens 7 and changed into parallel beam in a focusing state The parallel beam pass through the $\lambda/4$ plate again and are reflected by the polarizing face 13 of the polarization beam splitter 15. The reflected light beam is converged by the converging lens 19, given astigmatism by a cylindrical lens 20, and converged on an analyzer 21 so as to detect the focusing state of the objective lens 7. The use of the combination of a converging lens 19 and a cylindrical lens 20´ is known as the so-called astigmatism focus detecting method which is one of the focus detecting methods. In place of the astigmatism method, another method such as a knife edge method can be adopted to this invention for detecting the focus of the optical system of the optical information reproducing apparatus.

The two planes 55 and 56 of the wave surface changing member 57, as shown in FIGS. 1 and 5, can be formed by the etching method, but they are prepared by a lift-off method as described below in this embodiment. A polarization beam splitting layer 14 is formed on that surface of the triangle pillar-shaped prism member 58 which is opposed to the right angle portion of the prism member 58. Uniformly laminated on this face of the prism member 58 is a transparent layer having such a thickness that the phase angles of an s-wave surface and a p-wave surface after reflection differ by $\lambda/2$ from each other to provide a second plane 56. Here, the p-wave surface is not only a wave surface of a laser beam reflected by the second plane 56 but is a wave surface of a laser beam combined by interference after they have interfered with each other and have been combined. Then, a photoresist layer is formed on the second plane 56, covered with a mask having a striped configuration, or an elliptical or circular shape and developed after exposure. As a result, the region of the prism member 58 corresponding to the first plane 55 is uncovered but the photoresist layer is left in the region corresponding to the second plane 56. A transparent layer of the same material as that of the above-mentioned transparent layer and having a specific thickness is formed on the uncovered region to form the first plane 55. Thereafter, the photoresist is removed so as to uncover the second plane 56. Since segment laser beams can be totally reflected by means of both the planes 55 and 56, no further light reflecting layer is required.

In the optical system as shown in FIGS. 1 and 5, it is necessary to properly adjust the light amplitude ratio between two segment laser beams to be combined in order to form single beam spot having a minimum size on an information recording medium or an optical disc 18 after the laser beams have passed through the objective lens 7. Upon assembling the optical system, the $\lambda/2$ plate 23 is rotatably supported such that the amplitude ratio between the s-wave surface and the p-wave surface are suitably changed by the rotation of the $\lambda/2$ plate 23.

The optical converging system as shown in FIG. 1 has a relatively simple structure and ca be manufactured at a relatively low cost. When, therefore, the light converging optical system as shown in FIG. 1 is assembled into an information recording/reproducing optical system as shown in FIG. 5, the total optical system is not so bulky as and is less expensive than the conventional one.

Figure 6:
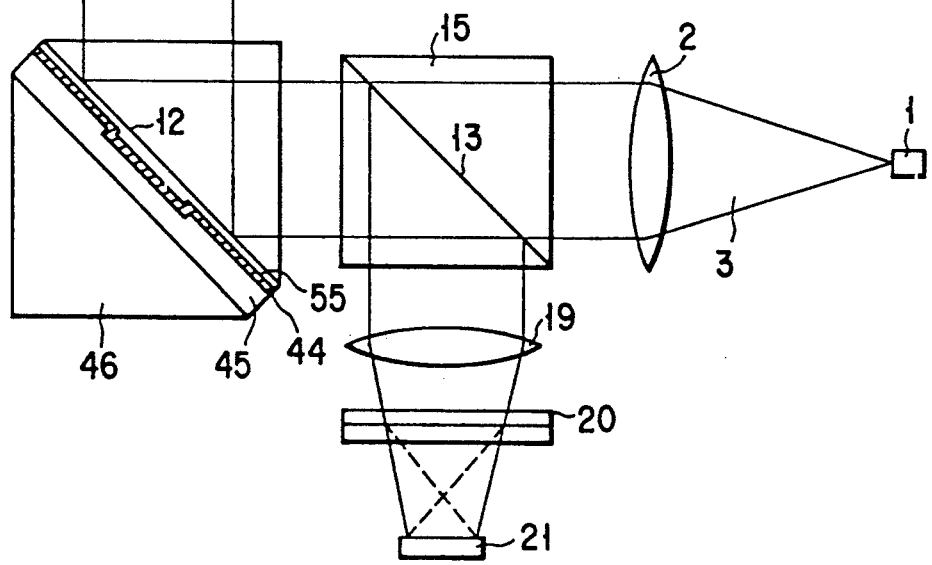

In FIG. 6 is shown an optical system to which the fundamental principle of this invention is applied. The optical system has a simpler structure than that of FIG. 5. In general, an optical head contains an optical system employing a folded mirror which bends the optical path and directs light beams toward an objective lens in order that the optical head is rendered thin. The optical system in FIG. 6 uses an optical characteristic changing means 57 which also has a function of a folded mirror. The optical characteristic changing means 57 has a half mirror face 12 in place of the polarization beam splitting face 14 as shown in FIG. 5. The light transmittance and the light reflectivity of the half mirror 12 are set such that the amplitude ratio between two segment light beams having divided amplitudes is set to a constant value. Differed from the wave surface changing member in FIG. 5, laser beam which have passed through the half mirror face 12 is reflected by a half coat layer 44. Light rays arriving at the information recording medium 8 as stray light rays can be fully reduced by setting the light reflectivity of the half coat layer 44 to a relatively small value by reflecting them a plurality of times between the half mirror face 12 and the half coat layer 44. The half coat layer 44 is fixed to the triangle pillar-shaped prism member 46 by means of an adhesive.

In the optical system as shown in FIG. 6, laser beam 3 generated from a semiconductor laser element 1 passes through a collimating lens 2 to have their cophasal surface changed into a plane and are directed toward the triangle pillar-shaped prism member 46 after having passed through a beam splitter 15. Portion of the laser beam is reflected as a segment laser beam by the half mirror 12 on the surface of the prism member 46, and the other portion of the laser beams passes through the half mirror 12 as a another segment laser beam to be directed toward the half coat layer 44. Since the half coat layer 44 has a first plane 55 and second plane 56 having a specific height difference from the first plane 55, the cophasal surface of the laser beam 3 is changed from a plane into a locally stepped face. Upon passing through the half mirror face 12, the segment laser beam 3 reflected by the half coat layer 12 interferes with the laser beam reflected by the half mirror face 12. The resultant interfering laser beam are converged on an information recording medium 18 by means of an objective lens 7. The segment laser beams converted on the information recording medium 18 forms a very small single beam spot as explained previously with reference to FIGS. 2A, 2B, 3A and 3B.

Another embodiment of an optical system, to which the fundamental principle of this invention is applied, will now be described with reference to FIG. 7. In the optical characteristic changing means 57 as shown in FIG. 1, the second plane 56 is disposed in the central portion of the first plane 55, and a height difference h corresponding to a phase difference of $\lambda/2$ is provided between two laser beams provided between the planes 55 and 56. In an optical characteristic changing means 61 as shown in FIG. 7, a first plane 59 is formed on one side of a central line and a second plane 60 is formed on the other side thereof. A height difference h' corresponding to a phase difference of $\lambda/4$ between two portions of the segment laser beam is provided between the two planes 59 and 60. The wave surface changing means 61 as shown in FIG. 7 causes the laser beam reflected by the polarization beam splitting face 14 to show a light amplitude distribution 62 on the information recording medium 18 as shown in FIG. 8A. On the other hand, the laser beam reflected by the wave surface changing means 61 exhibits, on the information recording medium 18, a light amplitude distribution 63 as shown by a broken line in FIG. 8A. The light amplitude distribution 63 has an unsymmetrical pattern with respect to the central line of the distribution which corresponds to the central line of the wave surface changing member 61 which divides its face into the first plane 59 and the second plane 60. When the two light amplitude distributions 62 and 63 are made out of phase by $\lambda/2$, they interfere with each other and the overlapping portions are canceled out and a light amplitude distribution 63 as shown in FIG. 8B is obtained. As apparent from the amplitude distribution 63 as shown in FIG. 8B, laser beams in this case form a relatively small beam spot a compared with the case in which laser beam is simply converged by means of the objective lens 7.

In this embodiment, portions of the two amplitude distributions are canceled out by causing two segment light beams to interfere with each other. However, it is also possible to form a converging spot having a small size by permitting two segment light beams to interfere with each other such that two amplitude distributions are added together. In the latter case, the intensity distribution of the laser beam 3, i.e., is the intensity of the center of the amplitude distribution is set to a low value and the intensities of its peripheral portions are made large, whereby the size of the converging spot can be rendered small. However, the use of this amplitude distribution is encountered with a problem that it has large side robes shown by 66 in FIG. 9A. In order to overcome this problem, the laser beam showing the light amplitude distribution 66 is overlapped with laser beam exhibiting a light amplitude distribution 65 providing a larger spot size than the light amplitude distribution 66 but having small side robes, and their phases are matched such that their intensities are enhanced, as shown in FIG. 9A. In such a way, a light amplitude distribution 67, which provides a smaller spot size than the light distribution 66 and has smaller side robes than the same, can be obtained as shown in FIG. 9B.

An optical system which can provide such a light amplitude distribution will now be explained with reference to FIG. 10. The optical system is arranged in such a manner that the plane of vibration of laser beams passing through a collimating lens 2 is oriented in a suitable direction by the adjustment of the rotation of a $\lambda/2$ plate 23 and the light amplitude ratio between the s-wave surfaces and the p-wave surfaces of the light beam is adjusted to the most suitable condition. The s-wave surface is reflected by a polarization beam splitting face 14, and a beam spot having a light amplitude distribution 65 as shown in FIG. 9A is formed on an information recording medium after the s-wave surface have passed through a beam splitter 15 and an objective lens 7. On the other hand, the p-wave surface pass through the polarization beam splitting face 14. Behind the polarization beam splitting face 14 are disposed a space layer 68 and a light reflecting layer 69 which are fixed to a triangle pillar-shaped prism member 46 by means of an adhesive and give a specific optical path difference to the p-wave surface. The light reflecting layer 69 has a large vacant region of a striped, circular or elliptical shape at its central portion. Laser beams enter the triangle pillar-shaped prism member 46 through the vacant region. Thus, the laser beam falling on only the peripheral portions of the p-wave surface is reflected by the light reflecting layer 69. The laser beam consisting of the p-wave surface reflected by the light reflecting layer 69 passes through the polarization beam splitting face 14, the beam splitter 15 and the objective lens 7, and the laser beam form, on the information recording medium, a beam spot having a relatively small size and exhibiting a light amplitude distribution as shown in FIG. 9A. Accordingly, the laser beam consisting of p-wave surface and the light beam consisting of s-wave surface are added together and form, on the information recording medium, a beam spot showing an light amplitude distribution as shown in FIG. 9B and having a relatively small beam spot.

The space layer 68 is formed by laminating transparent material such as oxide, fluoride or nitride by using the vacuum evaporation method or the spattering method. The light reflecting layer 69 can be formed not only by the lift-off method as previously described but also by the vacuum evaporation method or the spattering method with the polarization beam splitting face 14 covered with a mask having the same dimensions as the vacant region. For light beams whose planes of vibration are perpendicular to each other which are to be added together, the adding efficiency becomes the highest when p-wave surface and s-wave surface are out of phase by $\lambda/2$ (where n is an integer and is the wave length of the laser beam which is to be used) so as to constitute linear polarized light beam. In this respect, the thickness of the space layer 68 is selected such that this condition is satisfied.

In FIG. 11 is shown another embodiment of an optical system in which a wave surface changing member 61 used also as a folded mirror as shown in FIG. 10 is disposed just in front of an objective lens 7, whereby the optical system is rendered small. The same elements and portions of this embodiment as those of the embodiment shown in FIG. 11 are designated by the same referential numerals, the description thereof being omitted.

FIG. 12 illustrates an optical system using an optical characteristic layer 70 having a specific light reflectivity and a specific light transmittance in place of the $\lambda/2$ plate 23 and the polarization beam splitting face 14 of the optical system as shown in FIG. 10. It is desirable that the phase difference between laser beams reflected by the optical characteristic layer 70 and laser beam passing through the layer 70 after having been reflected by a light reflecting layer 71 is selected to be $n\lambda$. As a result of such setting of the phase difference, the phase difference between the two laser beams performing multiple reflections between the light characteristic layer 70 and the light reflecting layer 70 is an integer times $\lambda$. The multi-reflected laser beams are increased in intensity to form, on the information recording medium 18, a portion of a light converging pattern having a small spot size.

Figure 14B:
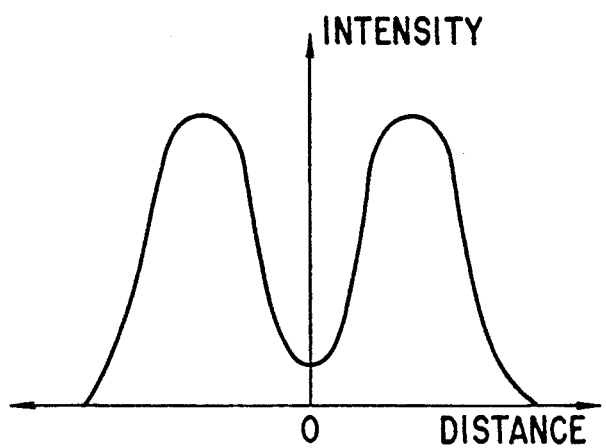
Figure 14C:
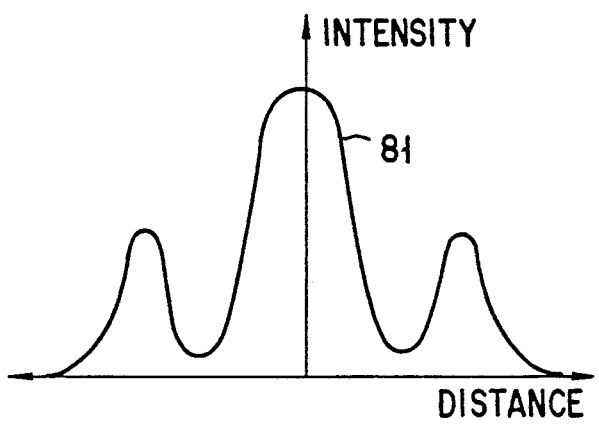
Figure 14D:
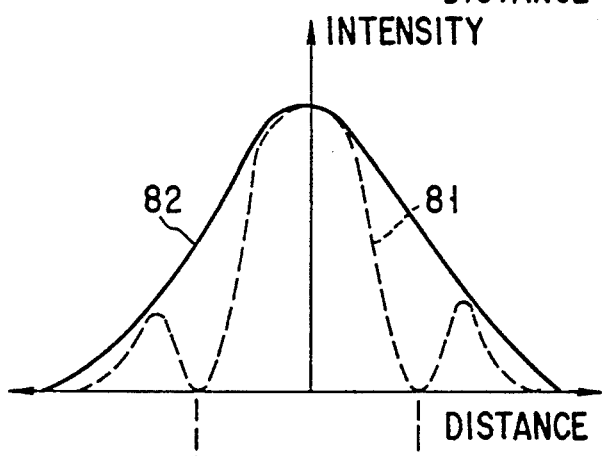
Figure 14E:
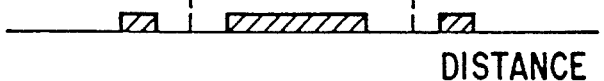

FIG. 13 shows a modified wave surface changing member 57 which is operated under the sam fundamental principle as explained with reference to FIGS. 4A and 4B. The thickness of a space layer 60 is selected so as to provide a phase difference of $\lambda/2$, and a mirror face 80 has a predetermined pattern. In the embodiment as shown in FIG. 4A, the light amplitude distribution 52 is obtained from the result of a phase difference. On the other hand, in the wave surface changing member 57 as shown in FIG. 13, the intensity distribution of light beams is changed by means of a mirror face 80 having a specific pattern. In other words, a simulation is for Fourier-tranforming the converging spot pattern is performed by means of a computer in order to determine the intensity distribution of light beams, and then the pattern of the mirror face 80 corresponding to the intensity distribution of the light beams is determined. The light beam amplitude distribution 52 as shown in FIG. 4A is similar to a ring-shaped amplitude distribution as shown in FIG. 14A. FIG. 14B shows a crosswise amplitude distribution when the ring is cut along line X—X. The Fourier transformation of the amplitude distributions shown in FIGS. 14A and 14B by means of a computer results in a pattern 81 having an intensity distribution as shown in FIG. 14C. The intensity distribution 82 of the laser beam 3 just after having passed through a collimating lens 2 exhibits a distribution similar to a Gauss distribution as indicated by a solid line in FIG. 14D. When the laser beam 3 is reflected by a mirror face 80 having a specific pattern as shown in FIG. 14E, a light intensity distribution having a pattern 81 as shown in FIG. 14C can be obtained The shape of the specific pattern of the mirror face 80 is obtained by simulating, by means of a computer, the intensity distribution 82 of the laser beam 3 just after they have passed through the collimating lens 2 and the Fourier-transformed pattern 81. From the result of the simulation, a mask pattern is manufactured by means of an electron beam exposing device, and a mirror face 80 having a specific pattern can be formed from the mask pattern by the previously mentioned lift-off method.

As described above, this invention provides a smaller light converging spot formed on an information recording medium than the conventional one and increases memory density on the information recording medium.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents

What is claimed is:

1. An optical system for combining and converging light beams on an information recording medium, comprising:

means for generating a light beam having cophasal wave surfaces and a predetermined amplitude;

means for reflecting a part of the light beam as a first beam component having the cophasal wave surfaces and a first intensity distribution and allowing the other part of the light beam to pass therethrough;

means for deforming the cophasal wave surfaces of the other part of the light beam and reflecting the light beam having the deformed wave surfaces as a second light beam component having a second intensity distribution different from the first intensity distribution; and means for combining the first and second light beam components into a single light beam and converging the single light beam on the information recording medium, the first light beam component interfering with the second light beam component to form a beam spot having a sharp intensity distribution on the information recording medium.

2. The optical system according to claim 1, wherein said deforming means includes means for applying a phase retardation between the first and second light beam components.

3. The optical system according to claim 1, wherein said deforming means includes means for patterning the wave surfaces of the other part of the light beam as the second beam component.

4. The optical system according to claim 1, wherein said deforming means includes a refractor plate having a stepped section.

5. The optical system according to claim 1, wherein said deforming means includes a reflection layer having a stepped section.

6. The optical system according to claim 1, wherein said deforming means includes a reflection layer having a region for permitting the other part of the light beam to pass therethrough.

7. The optical system according to claim 1, further comprising a reflection layer formed on the second refractor and having a region for permitting the other part of the light beam to pass therethrough.

8. The optical system according to claim 1, wherein the light beam from the generating means has an intensity distribution similar to the first intensity distribution of the first light beam component, wherein a peak intensity is defined at its center and the intensity gradually decreases from the center to its periphery, and the second light beam component has the second light intensity distribution wherein a peak intensity is defined between its center and periphery and a low intensity is defined at the center thereof.

9. An optical system for combining and converging light beams on an information recording medium, comprising:
 means for generating a light beam having cophasal wave surfaces and a predetermined amplitude;
 a first refractor having a reflection surface for reflecting a part of the light beam as a first beam component having the cophasal wave surfaces and a first intensity distribution and allowing the other part of the light beam to pass therethrough;
 a second refractor provided on the reflection surface of said first refractor, having surface regions for deforming the cophasal wave surfaces of the other part of the light beam and reflecting the light beam having the deformed wave surfaces as a second light beam component having a second intensity distribution different from the first intensity distribution; and
 means for combining the first and second light beam components into a single light beam and converging the single light beam and converging the single light beam on the information recording medium, the first light beam component interfering with the second light beam component to form a beam spot having a sharp intensity distribution on the information recording medium.

10. The optical system according to claim 9, wherein said second refractor applies a phase retardation between the first and second light beam components.

11. The optical system according to claim 9, wherein said second refractor patterns the wave surfaces of the other part of the light beam as the second beam component.

12. The optical system according to claim 9, wherein said second refractor has a stepped section.

13. The optical system according to claim 9, further comprising a reflection layer formed on the second refractor and having a stepped section.

14. The optical system according to claim 9, wherein the light beam from the generating means has an intensity distribution similar to the first intensity distribution of the first light beam component, wherein a peak intensity is defined at its center and the intensity gradually decreases from the center to its periphery, and the second light beam component has the second light intensity distribution wherein a peak intensity is defined between its center and periphery and a low intensity is defined at the center thereof.

* * * * *